(12) United States Patent
Janthur

(10) Patent No.: US 9,429,102 B2
(45) Date of Patent: Aug. 30, 2016

(54) METAL BEAD GASKET

(71) Applicant: BorgWarner Inc., Auburn Hills, MI (US)

(72) Inventor: Ingo Janthur, Ruesselsheim (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/360,695

(22) PCT Filed: Nov. 20, 2012

(86) PCT No.: PCT/US2012/065962
§ 371 (c)(1),
(2) Date: May 27, 2014

(87) PCT Pub. No.: WO2013/081898
PCT Pub. Date: Jun. 6, 2013

(65) Prior Publication Data
US 2014/0333034 A1 Nov. 13, 2014

(30) Foreign Application Priority Data
Dec. 1, 2011 (DE) .................. 10 2011 119 951

(51) Int. Cl.
*F16J 15/12* (2006.01)
*F02F 11/00* (2006.01)
*F16J 15/08* (2006.01)

(52) U.S. Cl.
CPC ............ *F02F 11/00* (2013.01); *F16J 15/0825* (2013.01); *F02F 11/002* (2013.01); *F05D 2220/40* (2013.01)

(58) Field of Classification Search
CPC ............... F16J 15/0818; F16J 15/0825; F16J 15/0831; F16J 15/0868
USPC .......................... 277/590, 591, 593, 594, 595
See application file for complete search history.

(56) References Cited

U.S. PATENT DOCUMENTS

| 4,995,624 | A | * | 2/1991 | Udagawa | ............... F02F 11/002 277/595 |
| 5,058,908 | A | * | 10/1991 | Udagawa | ............. F16J 15/0825 277/595 |
| 5,232,229 | A | * | 8/1993 | Udagawa | ............. F16J 15/0825 277/595 |
| 5,700,015 | A | * | 12/1997 | Tensor | ................... F16J 15/123 277/591 |

(Continued)

FOREIGN PATENT DOCUMENTS

| JP | 06-042644 A | 2/1994 |
| JP | 07-091547 A | 4/1995 |

OTHER PUBLICATIONS

International Search Report in International Application No. PCT/US2012/065962, dated Feb. 25, 2013.

*Primary Examiner* — Gilbert Lee
(74) *Attorney, Agent, or Firm* — A. Michael Tucker; Stephan A. Pendorf; Patent Central LLC

(57) ABSTRACT

A metal bead gasket (11) with a sealing region (12) having at least one bead (9), at least one bracing region (13) having at least one recess (21) for receiving a bracing means (5), in particular a screw, and at least one intermediate region (14) which connects the sealing region (12) to the bracing region (13). The intermediate region (14) is configured to be more deformationally unstable perpendicularly to the bracing direction (4) than the sealing region (12) and/or the bracing region (13).

16 Claims, 5 Drawing Sheets

(56) References Cited

U.S. PATENT DOCUMENTS

| | | | |
|---|---|---|---|
| 5,785,322 A * | 7/1998 | Suggs | F16L 23/18 |
| | | | 277/591 |
| 6,036,195 A * | 3/2000 | Udagawa | F16J 15/0818 |
| | | | 277/593 |
| 6,131,915 A * | 10/2000 | Nicholson | F16J 15/0825 |
| | | | 277/593 |
| 6,250,644 B1 | 6/2001 | Diez et al. | |
| 6,676,134 B1 * | 1/2004 | Wiegert et al. | 277/593 |
| 8,100,409 B2 * | 1/2012 | Schmitz | 277/593 |
| 8,496,253 B2 * | 7/2013 | Goettler et al. | 277/594 |
| 2003/0168818 A1 * | 9/2003 | Pepin | 277/593 |
| 2004/0217552 A1 * | 11/2004 | Sueda | 277/592 |
| 2005/0173868 A1 * | 8/2005 | Hatamura et al. | 277/593 |
| 2006/0097459 A1 | 5/2006 | Hohe et al. | |
| 2009/0066036 A1 * | 3/2009 | Schmitz | 277/595 |
| 2010/0164185 A1 | 7/2010 | Unseld et al. | |
| 2011/0001295 A1 * | 1/2011 | Egloff et al. | 277/592 |

* cited by examiner

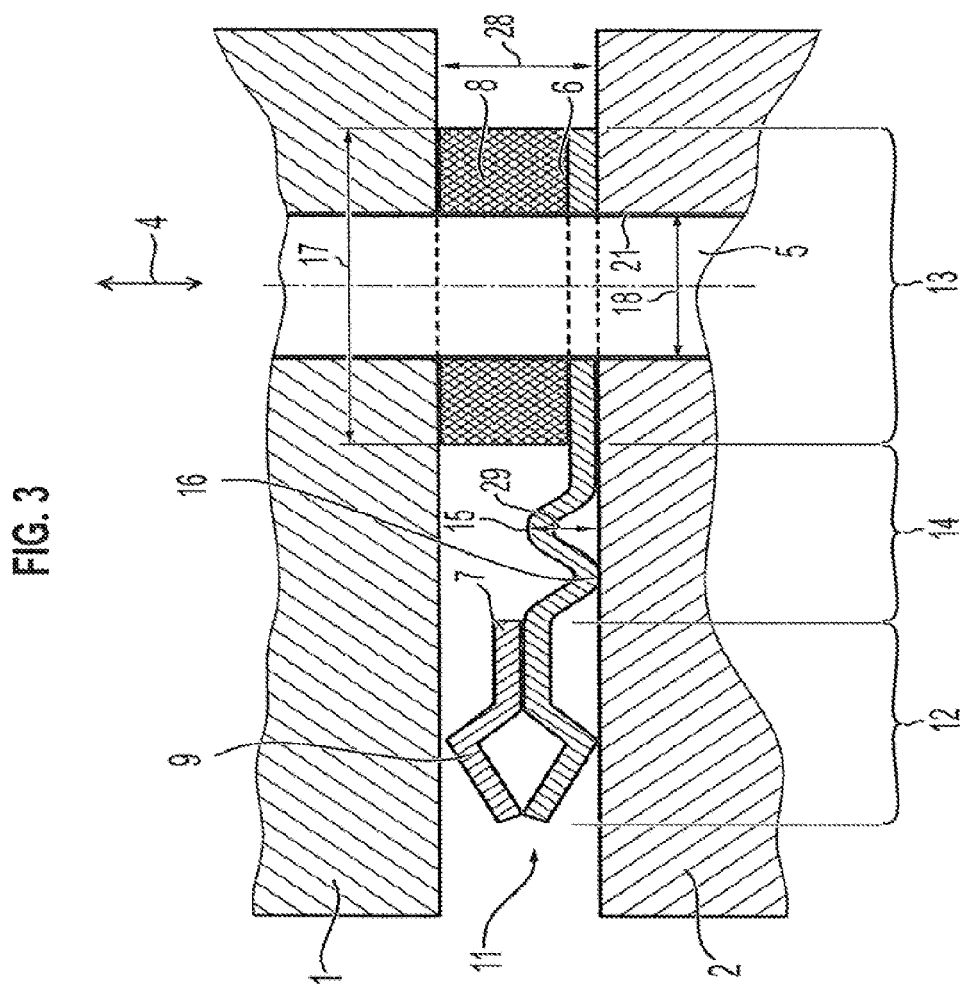

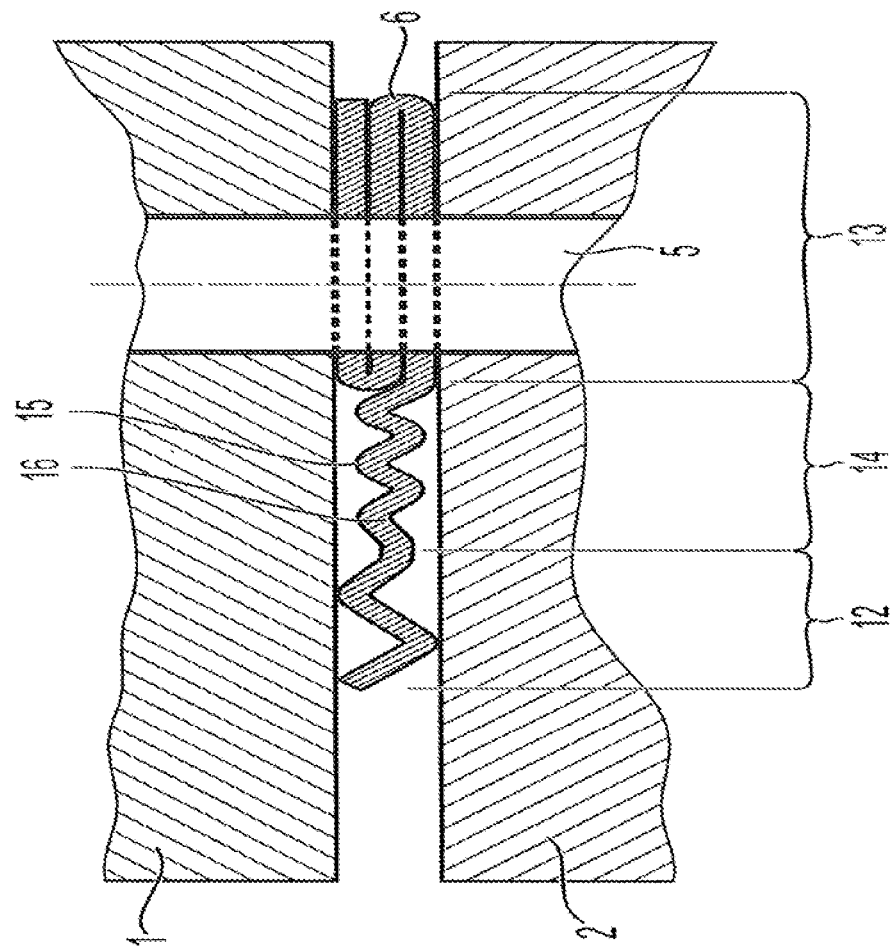

METAL BEAD GASKET

The invention relates to a metal bead gasket and to an exhaust-gas turbocharger comprising the metal bead gasket.

Metal bead gaskets act in such a manner that beads impressed into sealing plates press against the faces to be sealed. The contact between the beads and the faces to be sealed in this case is virtually linear. It is often the case that a plurality of sealing plates are placed one above another. The respective beads of the plates then make contact with the opposing sealing faces. Bead plates act as a result of the prestress of the beads, which largely retain their elasticity even under thermal loading. The materials are selected accordingly. If the beads are pressed to the blocking point, the action of the beads is lost since the bead is pressed flat. To prevent this, the metal bead gaskets are generally provided with a so-called "stopper layer". This ensures an adequate spacing of the sealing faces in the region of the beads.

FIG. 1 shows a metal bead gasket 3 according to the prior art between a first element 1 and a second element 2. The previously known metal bead gasket 3 comprises a first layer 6, a second layer 7 and a stopper layer 8. The three layers are stacked one above another. Beads 9 are formed in the first layer 6 and in the second layer 7. A bracing means 5, in particular a screw, projects through all three layers along a bracing direction 4. This bracing means 5 presses the two elements 1, 2 against one another. In this case, the bead 9 deforms and seals up. In the case of thermally induced expansion processes, the previously known metal bead gaskets 3 do not necessarily expand to the same extent as the sealing faces of the two elements 1, 2. In the case of gaskets subjected to high temperatures, the two layers 6, 7 are austenitic, whereas the elements 1, 2 to be sealed are ferritic. This leads to differences in expansion behavior. The pressed metal bead gasket 3 would expand further than the elements 1, 2 to be sealed in the case of thermal loading. Since this expansion is not possible, however, on account of the pressing, the metal bead gasket 3 is microscopically compressed. This compression is not completely reversed on cooling, since the strength of the metal bead gasket 3 initially increases on cooling, before the stresses become large enough to reverse the compression of the metal bead gasket 3. Therefore, previously known metal bead gaskets 3 which are subjected to high temperatures and have a stopper layer 8 are shortened as the cycle number increases, form irregularities and can tear. As a result, they become leaky. The use of slots for receiving the bracing means 5 does not prevent this adequately either.

FIG. 2 shows a further arrangement according to the prior art. Here, the previously known metal bead gasket 3 is received in a groove 10 in the first element 1. This metal bead gasket 3 does not comprise a stopper layer. In order, in this example of the metal bead gasket 3, to allow for adequate space for expansion, the groove 10 is milled into the first element 1. The depth of the groove 10 is selected here such that the metal bead gasket 3 cannot be pressed to the blocking point. The elements 1, 2 are thus correspondingly screwed directly against one another, in which case the metal bead gasket 3 does not become part of the screw assembly. A disadvantage here is that the machining of the first element 1 is complex and expensive as a result of the milling-in of the groove 10.

It is an object of the present invention to provide a metal bead gasket which makes it possible to achieve permanent and secure sealing of two elements with cost-effective production and assembly, in particular under high thermal loading.

The object is achieved by the combination of features in the independent claim. The dependent claims contain advantageous developments of the invention.

Therefore, the object is achieved by a metal bead gasket comprising a sealing region having at least one bead, at least one bracing region and at least one intermediate region which connects the sealing region to the bracing region. The bracing region has at least one recess for receiving a bracing means, in particular a screw. This recess is formed in particular as a through-hole or as a laterally open through-hole. According to the invention, the intermediate region is configured to be more deformationally unstable in a direction perpendicular to the bracing direction than the sealing region and/or the bracing region. The bracing direction extends substantially perpendicularly to the metal bead gasket, i.e. parallel to the bracing means or the screw. "Deformationally unstable" means, in particular, that the intermediate region deforms plastically and/or elastically under thermal heating of the entire metal bead gasket, such that stresses in the metal bead gasket are degraded. According to the invention, the metal bead gasket is a component part of a screw assembly, together with a first and a second element to be connected. It is preferable for the two elements to be connected to be clamped to one another only level with the bracing region. The rest of the regions of the faces to be sealed on the two elements can expand thermally and do not bring about any bracing of the metal bead gasket. The metal bead gasket can readily compensate for thermally induced deformations, in particular, on account of the deformationally unstable configuration of the intermediate region. A groove as shown in FIG. 2 according to the prior art is no longer required.

In a preferred embodiment, it is provided that the sealing region comprises at least two layers which are arranged one above another in the bracing direction, and the intermediate region comprises at least one layer less than the sealing region. In particular, the sealing region comprises two layers and the intermediate region comprises only one layer.

Furthermore, it is preferably provided that the bracing region comprises at least two layers which are arranged one above another in the bracing direction, and the intermediate region comprises at least one layer less than the bracing region. In particular, the bracing region comprises two layers, with one of the two layers being the so-called stopper layer.

Furthermore, it is preferably provided that at least one corrugation which ascends in the bracing direction is formed in the intermediate region. In particular, the intermediate region is formed as a corrugated plate. The formation of corrugations in the plate of the intermediate region makes the intermediate region "concertina-like".

In a particularly preferred embodiment, it is provided that the intermediate region comprises at least one web between the bracing region and the sealing region, wherein a length of the web in particular is greater than a width of the web. The metal bead gasket preferably comprises a plurality of bracing regions each having a recess for the insertion of a bracing means. Each of these bracing regions is connected to the sealing region by means of a separate web. So that the metal bead gasket remains sufficiently displaceable by thermal expansion with respect to the screwing points, the bracing regions are connected to the sealing region preferably only by the thin and concertina-like web. This ensures that the metal bead gasket can expand and the position remains ensured by the binding to the screwing points.

An imaginary line is defined between the center of gravity of the overall metal bead gasket and the central point of one of the recesses in the bracing region. An angle between the web and this imaginary line lies between 30° and 150°, in particular between 40° and 140°, in particular between 50° and 130°. It is preferable for the angle of each web to be formed in accordance with these angular ranges. Particularly in the case of round or circumferential metal bead gaskets, the configuration of the webs in this angular range leads to an approximately radial extent of the webs. An overall diameter of the metal bead gasket is thereby kept as small as possible.

Furthermore, it is preferably provided that a first thickness of the bracing region lies between a second thickness of the intermediate region and a third thickness of the sealing region. The thicknesses are measured in this case in the bracing direction. The thickness of the sealing region is to be measured in the unmounted state. As a result of this configuration, the intermediate region has in particular sufficient possibilities to expand in the bracing direction.

Furthermore, it is preferably provided that the metal bead gasket has at least one layer which is manufactured in one piece and which is a component part common to the bracing region, the intermediate region and the sealing region.

Furthermore, it is preferably provided that a ratio between a greatest first diameter of the bracing region, measured perpendicularly to the bracing direction, and a second diameter of the recess for the bracing means is at most 5, in particular at most 4, in particular at most 3. This ensures that the size of the bracing region, in particular the size of the stopper layer, is kept as small as possible, such that sufficient space is available for the intermediate region.

The metal bead gasket is particularly preferably manufactured from a metal plate. The stopper layer can consist both of metal and also of plastic.

The invention furthermore encompasses an exhaust-gas turbocharger comprising at least one of the metal bead gaskets just described. Particularly in the case of exhaust-gas turbochargers, the metal bead gaskets are very often exposed to thermal stresses, and therefore here the metal bead gasket according to the invention is used with particular preference.

Exemplary embodiments are explained in detail hereinbelow in association with the accompanying drawing, in which.

Figure 1:
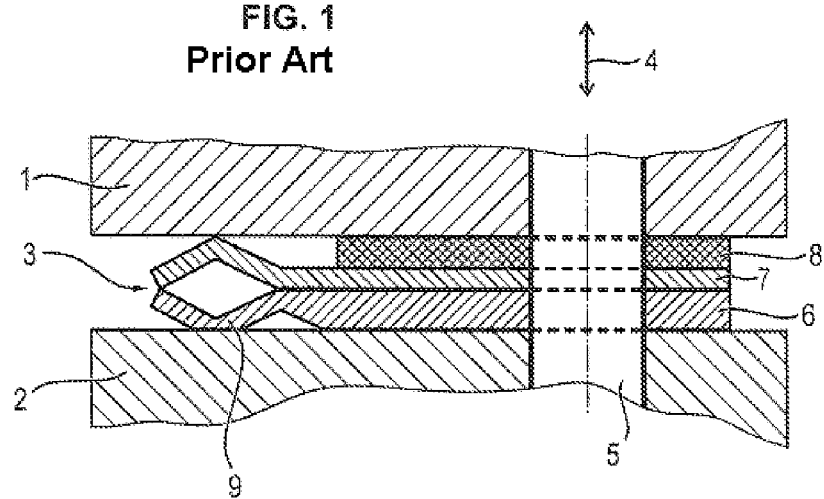
FIG. 1 shows a metal bead gasket according to the prior art.
Figure 2:
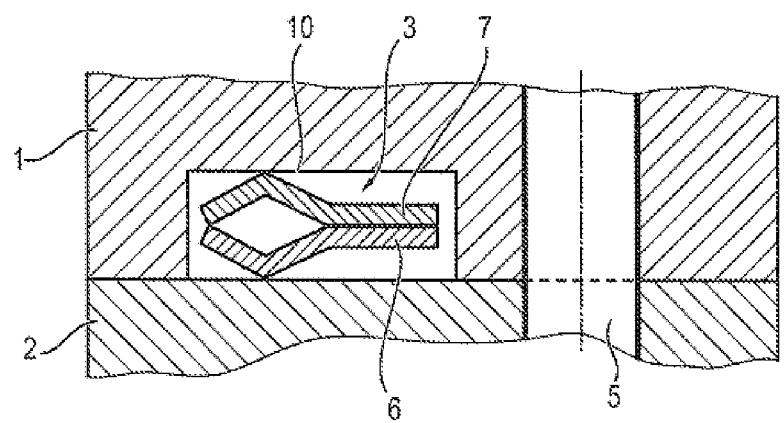
FIG. 2 shows a further metal bead gasket according to the prior art.
Figure 4:
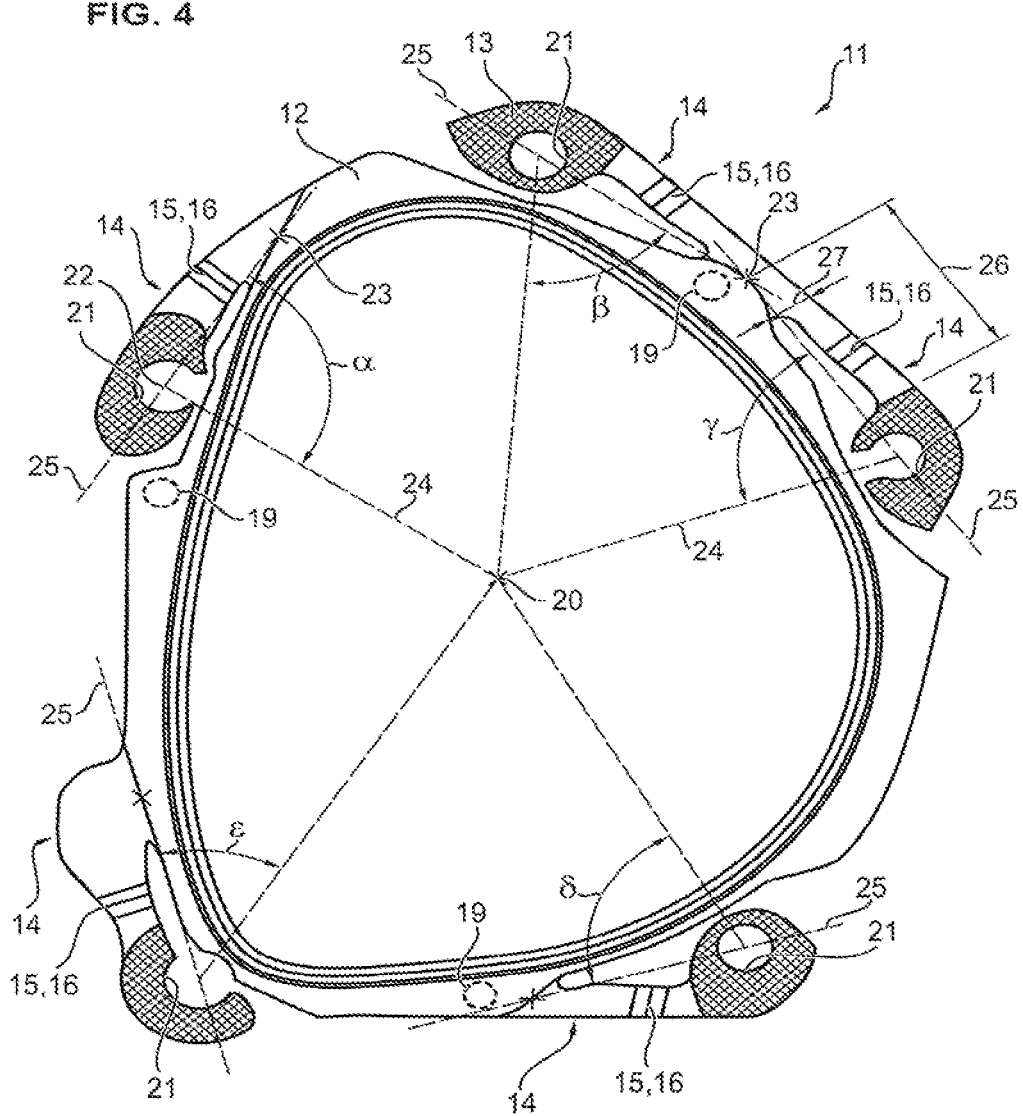
Figure 5:
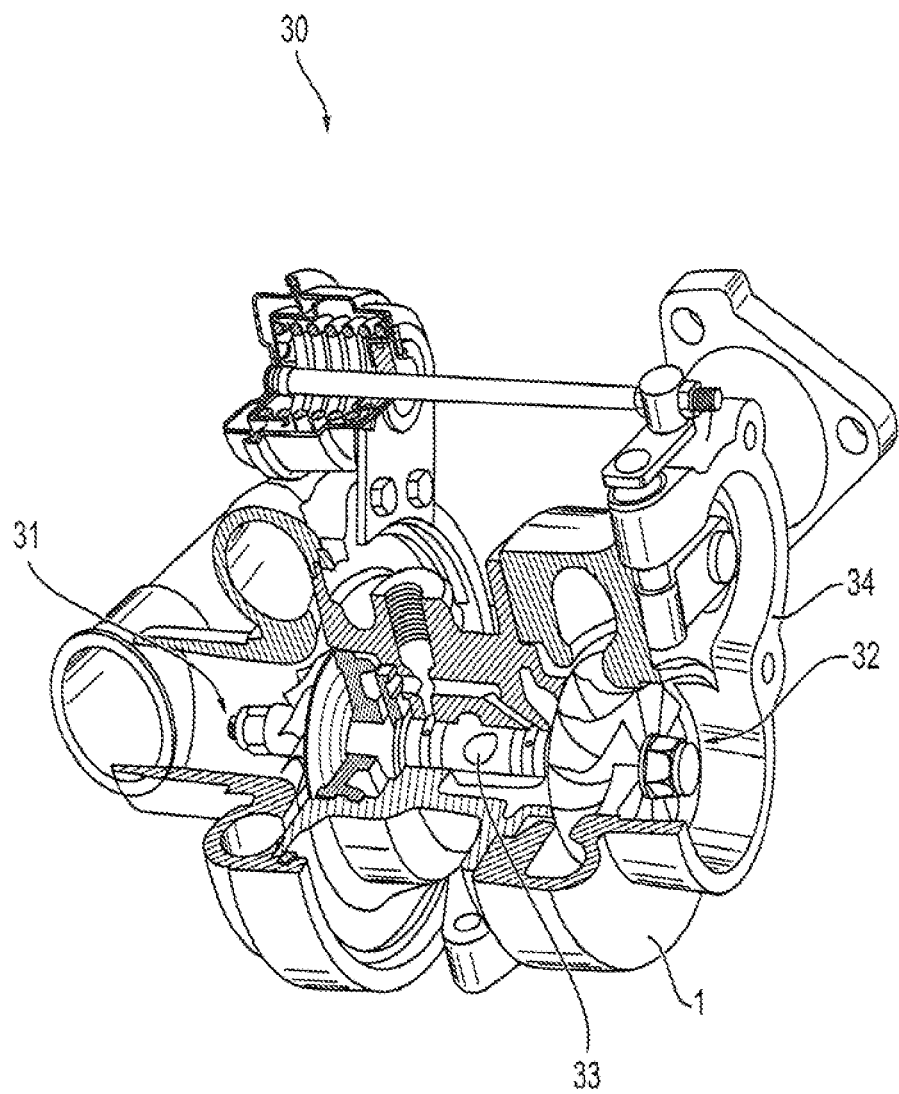

FIG. 3 shows a sectional view of a metal bead gasket according to the invention according to a first exemplary embodiment, FIG. 3*a* shows a sectional view of a metal bead gasket according to the invention according to a second exemplary embodiment, FIG. 4 shows a plan view of the metal bead gasket according to the invention according to the first exemplary embodiment, and FIG. 5 shows an exhaust-gas turbocharger according to the invention having a sealing face for the metal bead gasket according to the invention according to both exemplary embodiments.

Exemplary embodiments of the invention are explained in detail hereinbelow with reference to FIGS. 3 to 5.

FIG. 3 shows a metal bead gasket 11 in the mounted state between a first element 1 and a second element 2. The metal bead gasket 11 seals the opposing faces of the first and second elements 1, 2 with respect to one another.

The two elements 1, 2 are pressed together by means of a connection means 5, formed as a screw. The connection means 5 extends in the bracing direction 4. A recess 21, formed as a through-hole, is provided in the metal bead gasket 11. The connection means 5 extends through this recess 21 from the first element 1 to the second element 2.

In a direction perpendicular to the bracing direction 4, the metal bead gasket 11 is divided into a sealing region 12, a bracing region 13 and an intermediate region 14. The intermediate region 14 lies between the sealing region 12 and the bracing region 13. The sealing region 12 merges directly into the intermediate region 14. The intermediate region 14 merges directly into the bracing region 13. The metal bead gasket 11 comprises a first layer 6 made of a metallic plate. The first layer 6 extends over all three regions, the sealing region 12, the bracing region 13 and the intermediate region 14. Furthermore, the metal bead gasket 11 comprises a second layer 7 made of a metallic plate and a stopper layer 8. The second layer 7 extends merely over the sealing region 12. The stopper layer 8 extends merely over the bracing region 13. The second layer 7 lies on the first layer 6. The stopper layer 8 likewise lies on the first layer 6. Therefore, the intermediate region 14 is formed only by the first layer 6.

Beads are formed in the first layer 6 and in the second layer 7 in the sealing region 12. These beads are deformed slightly upon pressing of the two elements 1, 2 and therefore seal the two elements 1, 2 with respect to one another. The intermediate region 14 has two corrugations 15, 16 in the first layer 6. These corrugations 15, 16 represent a "concertina-like" configuration of the intermediate region 14.

The bracing region 13 defines, with the first layer 6 and the stopper layer 8, the minimum distance between the two elements 1, 2. Measured in the bracing direction 4, the bracing region 13 has a first thickness 28. The concertina-like region in the intermediate region 14 has a second thickness 29, likewise measured in the bracing direction 4. The first thickness 28 is significantly larger than the second thickness 29. Furthermore, the first thickness 28 is smaller than a third thickness at the sealing region 12 in the unmounted state.

Furthermore, FIG. 3 shows a first diameter 17. This first diameter 17 defines the maximum diameter of the bracing region 13, in particular of the stopper layer 8. A second diameter 18 denotes the internal diameter of the recess 21. The first diameter 17 is chosen to be as small as possible so that sufficient space is available for the sealing region 12 and the intermediate region 14. The first diameter 17 is adapted depending on the size of the recess 21 or the size of the selected bracing means 5.

FIG. 3*a* describes a further embodiment of the gasket according to the invention, in which both the sealing region 12 and the intermediate region 14 consist of only one layer. In this case, the height of the beads is to be selected to be higher in the sealing region 12 than in the intermediate region 14. The bracing region 13 can in this case be produced by a flange or by folding the one layer.

FIG. 4 shows the metallic gasket 11 from FIG. 3 in a plan view. With reference to FIG. 4, it can readily be seen that the sealing region 12 is formed as a closed ring. Furthermore, the metal bead gasket 11 has a plurality of bracing regions 13 each having a recess 21. The individual bracing regions 13 are each connected to the sealing region 12 via an intermediate region 14 formed as a web.

Furthermore, FIG. 4 shows that the recesses 21 can be formed both as closed holes and as laterally open holes. The second layer 7 is connected to the first layer 6 by way of the weld spots 19 drawn in.

The intermediate regions 14, formed as webs, are arranged substantially radially around the sealing region 12. This radial arrangement is defined in particular as follows: a center of gravity 20 of the metal bead gasket 11 is drawn in in FIG. 4. Similarly, for each recess 21 FIG. 4 shows a central point 22 of the corresponding recess 21. A connection between the central point 22 and the center of gravity 20 is denoted as a first imaginary line 24. Furthermore, reference sign 23 in FIG. 4 denotes a center of the end of the web at the sealing region 12. A second imaginary line 25 runs through the central point 22 and this center 23. An angle between the first imaginary line 24 and the second imaginary line 25 is denoted by α, β, γ, δ, ε with respect to the individual bracing regions 13. The respective angles lie between 30° and 150°, in particular between 40° and 140°, in particular between 50° and 130°. These webs can also be designed in such a way, in particular in such a narrow form, that they are also unstable in the radial direction and not exclusively transversely to the direction of the corrugation. This can also be achieved by a corresponding orientation of further corrugations.

Furthermore, FIG. 4 shows a length 26 of the intermediate regions 14 formed as webs. The length 26 is measured from the center 23 parallel to the second imaginary line 25 as far as the bracing region 13. A width 27 of the webs is measured at the widest point of the webs, perpendicularly to the second imaginary line 25. The length 26 is in particular greater than the width 27. In particular, the length 26 is at least 1.2 times, in particular 1.5 times, the width 27.

FIG. 5 shows an exhaust-gas turbocharger 30 having a compressor 31 and a turbine 32. The rotors of the compressor 31 and of the turbine 32 are connected via a shaft 33. The turbine 32 is driven by way of exhaust gas from an internal combustion engine. The compressor 31 is made to rotate and thus the charge air for the internal combustion engine is supercharged by way of the shaft 33. The housing 1 (first element) has at least one sealing face 34. The metal bead gasket 11 and a cover (second element) are placed on and screwed to said sealing face 34.

In addition to the above written description of the invention, reference is hereby explicitly made, for disclosure supplementary thereto, to the diagrammatic illustration of the invention in FIGS. 3 to 5.

LIST OF REFERENCE SIGNS

1 First element
2 Second element
3 Metal bead gasket according to the prior art
4 Bracing direction
5 Bracing means (screw)
6 First layer
7 Second layer
8 Stopper layer
9 Beads
10 Groove
11 Metal bead gasket according to the invention
12 Sealing region
13 Bracing region
14 Intermediate region
15 First corrugation
16 Second corrugation
17 First diameter
18 Second diameter
19 Weld spots
20 Center of gravity
21 Recess
22 Central point of the recess
23 Center of the end of the webs
24 First imaginary line
25 Second imaginary line
26 Length
27 Width
28 First thickness
29 Second thickness
30 Exhaust-gas turbocharger
31 Compressor
32 Turbine
33 Shaft
34 Sealing face

The invention claimed is:

1. A metal bead gasket (11) comprising:
   a sealing region (12) having at least one bead (9),
   at least one bracing region (13) having at least one through-hole (21) for receiving a bracing means (5), and
   at least one intermediate region (14) which connects the sealing region (12) to the bracing region (13),
   wherein at least two corrugations (15, 16) which ascend in the bracing direction (4) are formed in the intermediate region (14) whereby the intermediate region (14) is more deformationally unstable perpendicularly to the bracing direction (4) than the sealing region (12) and/or the bracing region (13), and
   wherein the intermediate region (14) comprises at least one web between the bracing region (13) and the sealing region (12), wherein a length (26) of the web is greater than a width (27) of the web.

2. The metal bead gasket as claimed in claim 1, wherein the sealing region (12) comprises at least two layers (6, 7) which are arranged one above another in the bracing direction (4), and the intermediate region (14) comprises at least one layer less than the sealing region (12).

3. The metal bead gasket as claimed in claim 1, wherein the sealing region (12) and the intermediate region (14) comprise at least one layer (6).

4. The metal bead gasket as claimed in claim 1, wherein a respective bracing region (13) having a recess (21) is connected to the sealing region (12) in each case by means of a web.

5. The metal bead gasket as claimed in claim 1, wherein an angle (α, β, γ, δ, ε) between the web and an imaginary line (24) from the center of gravity (20) of the metal bead gasket (11) to the central point (22) of the recess (21), at the bracing region (13) of which the web begins, lies between 30° and 150°.

6. The metal bead gasket as claimed in claim 5, wherein an angle (α, β, γ, δ, ε) between the web and an imaginary line (24) from the center of gravity (20) of the metal bead gasket (11) to the central point (22) of the recess (21), at the bracing region (13) of which the web begins, lies between 40° and 140°.

7. The metal bead gasket as claimed in claim 5, wherein an angle (α, β, γ, δ, ε) between the web and an imaginary line (24) from the center of gravity (20) of the metal bead gasket (11) to the central point (22) of the recess (21), at the bracing region (13) of which the web begins, lies between 50° and 130°.

8. The metal bead gasket as claimed in claim 1, wherein a first thickness (28) of the bracing region (13), measured in the bracing direction (4), lies between a second thickness (29) of the intermediate region (14) and a third thickness of the sealing region (12), in the unmounted state.

9. The metal bead gasket as claimed in claim 1, comprising at least one continuous layer (6), which is manufactured in one piece and which is a component part of the bracing region (13), of the intermediate region (14) and of the sealing region (12).

10. The metal bead gasket as claimed in claim 1, wherein a ratio between a greatest first diameter (17) of the bracing region (13), measured perpendicularly to the bracing direction (4), and a second diameter (18) of the recess (21) for the bracing means (13) is at most 5.

11. The metal bead gasket as claimed in claim 1, wherein the bracing means (5) is a screw.

12. The metal bead gasket as claimed in claim 1, wherein a ratio between a greatest first diameter (17) of the bracing region (13), measured perpendicularly to the bracing direction (4), and a second diameter (18) of the recess (21) for the bracing means (13) is at most 4.

13. The metal bead gasket as claimed in claim 1, wherein a ratio between a greatest first diameter (17) of the bracing region (13), measured perpendicularly to the bracing direction (4), and a second diameter (18) of the recess (21) for the bracing means (13) is at most 4.

14. The metal bead gasket as claimed in claim 1, wherein a ratio between a greatest first diameter (17) of the bracing region (13), measured perpendicularly to the bracing direction (4), and a second diameter (18) of the recess (21) for the bracing means (13) is at most 4.

15. The metal bead gasket as claimed in claim 1, wherein a ratio between a greatest first diameter (17) of the bracing region (13), measured perpendicularly to the bracing direction (4), and a second diameter (18) of the recess (21) for the bracing means (13) is at most 3.

16. An exhaust-gas turbocharger comprising at least one metal bead gasket (3) as claimed in claim 1.

\* \* \* \* \*